US009763233B2

(12) United States Patent
Uchino et al.

(10) Patent No.: US 9,763,233 B2
(45) Date of Patent: Sep. 12, 2017

(54) USER APPARATUS AND UPLINK CONTROL INFORMATION TRANSMISSION METHOD

(71) Applicant: NTT DOCOMO, INC., Tokyo (JP)

(72) Inventors: Tooru Uchino, Tokyo (JP); Hideaki Takahashi, Tokyo (JP); Yuta Sagae, Tokyo (JP); Kazuaki Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 243 days.

(21) Appl. No.: 14/647,663

(22) PCT Filed: Nov. 26, 2013

(86) PCT No.: PCT/JP2013/081731
§ 371 (c)(1),
(2) Date: May 27, 2015

(87) PCT Pub. No.: WO2014/084196
PCT Pub. Date: Jun. 5, 2014

(65) Prior Publication Data
US 2015/0334699 A1 Nov. 19, 2015

(30) Foreign Application Priority Data

Nov. 30, 2012 (JP) ................................. 2012-262951

(51) Int. Cl.
*H04W 72/04* (2009.01)
*H04L 5/00* (2006.01)

(52) U.S. Cl.
CPC ....... *H04W 72/0413* (2013.01); *H04L 5/0053* (2013.01)

(58) Field of Classification Search
CPC .................... H04W 72/0413; H04L 5/0053
See application file for complete search history.

(56) References Cited

U.S. PATENT DOCUMENTS

2011/0243106 A1* 10/2011 Hsu .................. H04L 5/0096
370/336
2012/0300635 A1* 11/2012 Jersenius .......... H04W 72/0486
370/235

(Continued)

FOREIGN PATENT DOCUMENTS

JP 2012095288 A 5/2012
JP 2012216968 A 11/2012

OTHER PUBLICATIONS

Office Action issued in the counterpart Japanese Patent Application No. 2012-262951, dated Nov. 22, 2016 (5 pages).

(Continued)

*Primary Examiner* — Ian N Moore
*Assistant Examiner* — Latresa McCallum
(74) *Attorney, Agent, or Firm* — Osha Liang LLP (57) ABSTRACT

A user apparatus in a mobile communication system in which carrier aggregation is performed using a plurality of cells is disclosed. The user apparatus includes a processor that determines whether a physical uplink shared channel (PUSCH) is set in the user apparatus at a transmission timing of uplink control information, and determines to transmit the uplink control information by using the PUSCH when the PUSCH is set. The user apparatus also includes a transmitter that transmits the uplink control information to a radio base station using the PUSCH. The processor determines, when a PUSCH is set in a first cell in the plurality of cells, to transmit the uplink control information using the PUSCH. When no PUSCH is set in the first cell, the processor determines to transmit the uplink control information using a PUSCH in a second cell.

17 Claims, 9 Drawing Sheets

(56) References Cited

U.S. PATENT DOCUMENTS

2013/0182676 A1* 7/2013 Lee .................. H04L 1/0027
370/329
2013/0188590 A1 7/2013 Aiba et al.

OTHER PUBLICATIONS

International Search Report issued in PCT/JP2013/081731, dated Dec. 24, 2013 (5 pages).
Written Opinion issued in PCT/JP2013/081731, dated Dec. 24, 2013 (4 pages).
3GPP TS 36.300 V11.3.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11);" Section 7.5 (2 pages).
Renesas Mobile Europe Ltd., "On UL Control Enhancement for Macro-RRH Deployments," 3GPP TSG RAN WG1 Meeting #70, R1-123571; Qingdao, China; Aug. 13-17, 2012 (3 pages).
Office Action issued in the counterpart Japanese Patent Application No. 2012-262951, dated May 9, 2017 (5 pages).

* cited by examiner

PCell PUSCH EXISTS

FIG.8

NO PCell PUSCH

USER APPARATUS AND UPLINK CONTROL INFORMATION TRANSMISSION METHOD

TECHNICAL FIELD

The present invention relates a mobile communication system in which CA (Carrier Aggregation) is performed. More particularly, the present invention relates to a technique in which a user apparatus of the mobile communication system in which CA (Carrier Aggregation) is performed selects a channel for transmitting uplink control information.

BACKGROUND ART

In the LTE (Long Term Evolution) scheme and the LTE-Advanced scheme, PUCCH (Physical Uplink Control Channel) is defined as a control channel for transmitting uplink control information (UCI (Uplink Control Information)). As the uplink control information transmitted by using PUCCH, there are, for example, CQI (Channel Quality Indicator) that is channel quality information, ACK/NACK that is acknowledgement information for a data signal transmitted in downlink, and a scheduling request (SR: Scheduling Request) that is transmitted when a data signal to be transmitted in uplink occurs.

Also, in the LTE-Advanced scheme, a user apparatus UE and a radio base station eNB are configured to be able to perform CA (Carrier Aggregation) by using a plurality of cells.

When CA is performed, the user apparatus UE is configured with a PCell (Primary cell) that is a cell having high reliability for securing connectivity and an SCell (Secondary cell) that is an ancillary cell. First, the user apparatus UE connects to the PCell, and can add an SCell as necessary. The PCell is a cell similar to a cell of the LTE scheme supporting RLM (Radio Link Monitoring), SPS (Semi-Persistent Scheduling) and the like. It is necessary to perform handover processes for changing the PCell of the user apparatus UE.

The SCell is configured in the user apparatus UE by being added to the PCell. Addition and deletion of the SCell is performed by an RRC (Radio Resource Control) signaling. The SCell is in an deactivated state right after it is configured in the user apparatus UE. Thus, the SCell is a cell that can be used for communication (scheduling can be performed) only after activating the SCell in an MAC (Media Access Control) layer.

Also, in the LTE-Advanced scheme, PUSCH-PUCCH simultaneous transmission is available in which a PUCCH and a PUSCH (Physical Uplink Shared Channel) for transmitting data are transmitted simultaneously. The meaning of the PUSCH-PUCCH simultaneous transmission includes both of PUSCH-PUCCH simultaneous transmission within the same cell and PUSCH-PUCCH simultaneous transmission in a plurality of cells.

A carrier corresponding to a cell in CA is called a CC (Component Carrier). In each cell in CA, a cell corresponding to an uplink can be called a cell for uplink, and a cell corresponding to a downlink can be called a cell for downlink. Also, "transmit/receive a signal in a particular cell" means "transmit/receive a signal using a component carrier corresponding to the cell".

In the LTE scheme, the uplink control information is normally transmitted from the user apparatus UE to the radio base station eNB via a PUCCH. In a predetermined case, the uplink control information is transmitted by using a PUSCH that transmits data in a normal case. This is called piggyback.

Figure 1:
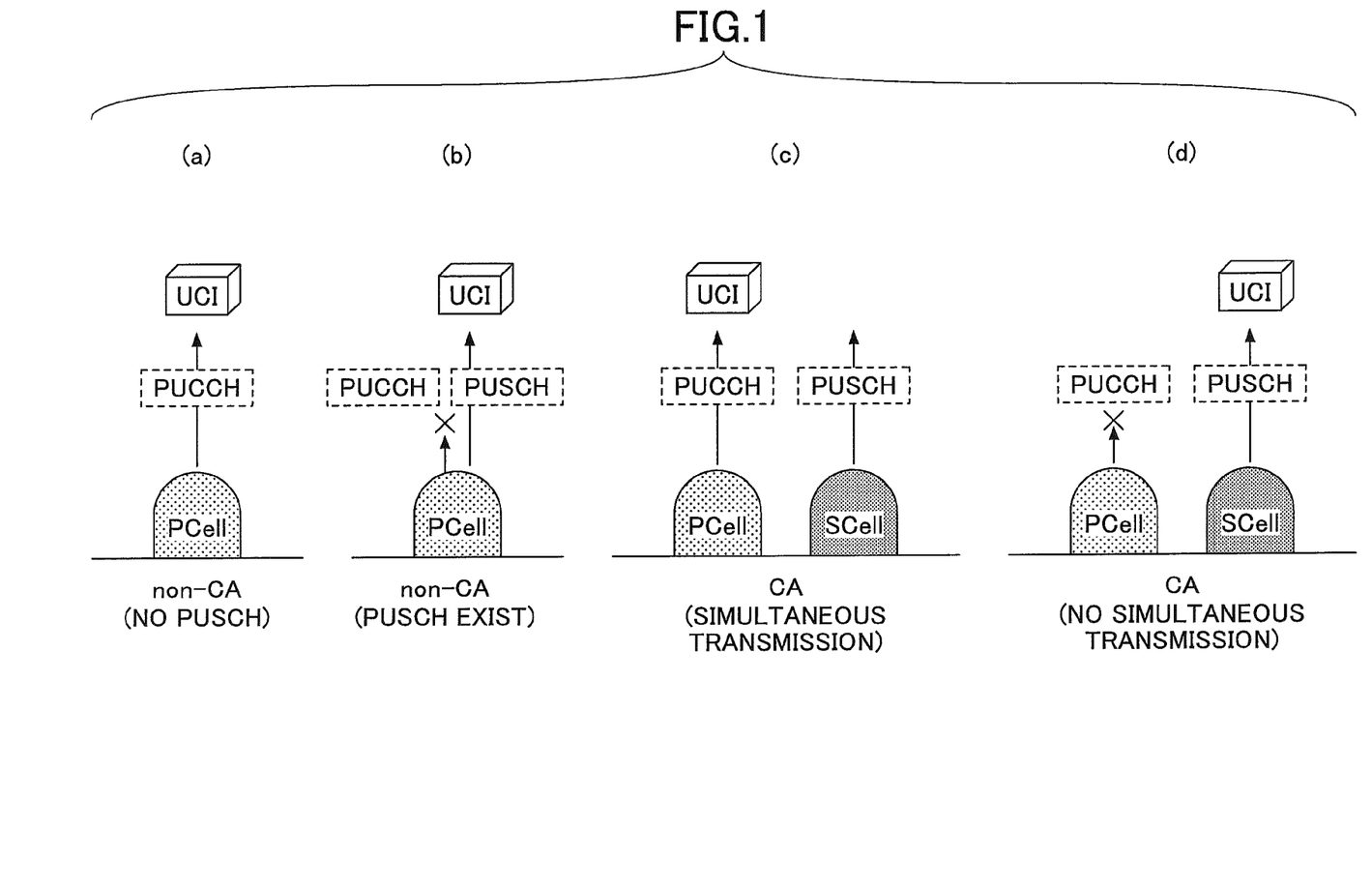
FIG. 1 is a diagram for explaining UCI piggyback.

Referring to FIG. 1, examples of a case where piggyback is performed and a case where piggyback is not performed are described.

FIG. 1 (a) shows a normal case in which CA is not configured. FIG. 1 (a) shows that uplink control information is transmitted by a PUCCH when a PUSCH is not assigned at a transmission timing of the uplink control information.

FIG. 1 (b) shows a case in which CA is not configured, and shows that uplink control information is transmitted by a PUSCH when the PUSCH is assigned (that is, in a case when the user apparatus receives a scheduling grant, and is assigned a radio resource so that the user apparatus can transmit data) at a transmission timing of the uplink control information. Even when the PUSCH is assigned, if the user apparatus UE is configured with PUSCH-PUCCH simultaneous transmission, the UE transmits uplink control information by using a PUCCH. But, if the user apparatus UE is not configured with PUSCH-PUCCH simultaneous transmission (including a case where the user apparatus UE does not have an ability of PUSCH-PUCCH simultaneous transmission), the UE transmits uplink control information by using the assigned PUSCH.

FIG. 1 (c) shows a case where CA is configured and, at a transmission timing of uplink control information, a PUCCH is configured on PCell, a PUSCH is configured on SCell, and PUSCH-PUCCH simultaneous transmission is available. In this case, the uplink control information is transmitted by the PUCCH of the PCell.

FIG. 1 (d) shows a case where CA is configured and, at a transmission timing of uplink control information, a PUSCH is configured on SCell, and PUSCH-PUCCH simultaneous transmission is not available. In this case, the uplink control information is transmitted by the PUSCH of the SCell.

RELATED ART DOCUMENT

Non-Patent Document

Non-Patent Document 1: 3GPP TS36.300 v11.3.0 section7.5

SUMMARY OF THE INVENTION

Problem to be Solved by the Invention

In CA of the LTE scheme before Release-11, PUCCH is supported only on PCell, thus, uplink control information such as feedback information on all of the cells for downlink is transmitted via the PUCCH on the PCell.

However, in the case where the PUCCH is transmitted only on a particular cell (PCell), there is a problem in that PUCCH resources lack if many user apparatuses UEs use the particular cell as a PCell. Thus, from the viewpoint of load balancing of PUCCH, support of PUCCH on SCell is being studied.

Also, in the LTE scheme after Release-12, adoption of "Inter-site CA" using CCs (cells) under different radio base stations eNBs is being studied. In the "Inter-site CA", feedback information (such as CQI, ACK/NACK, and the like) to be transmitted by a PUCCH should be transmitted to a radio base station eNB that has performed corresponding downlink transmission. Also, from this viewpoint, support of PUCCH on SCell is being studied.

As described before, regarding PUCCH on PCell, it is defined that, in a case where PUCCH-PUSCH simultaneous transmission is not available, uplink control information that was supposed to be transmitted by a PUCCH is transmitted by a PUSCH (UCI piggyback). However, since there is no mechanism for determining to which cell's PUSCH the uplink control information should be piggybacked when SCell PUCCH is supported, there is a problem in that the user apparatus UE cannot ascertain on which cell for uplink the uplink control information should be transmitted by a PUSCH. Also, there is a problem in that the radio base station eNB cannot ascertain on which cell for uplink the uplink control information is expected to be received by the PUSCH.

The present invention is contrived in view of the above-mentioned problems, and an object of the present invention is to provide a user apparatus that can determine a cell for uplink on which uplink control information should be transmitted by a PUSCH in a case where the uplink control information is transmitted via a PUSCH by performing piggyback in CA using a plurality of cells supporting PUCCH.

Means for Solving the Problem

For solving the problem, according to an embodiment of the present invention, there is provided a user apparatus in a mobile communication system in which carrier aggregation is performed using a plurality of cells, including:

a control unit configured to determine whether a physical uplink shared channel is set in the user apparatus at a transmission timing of uplink control information in the user apparatus, and to determine to transmit the uplink control information by using the physical uplink shared channel when the physical uplink shared channel is set; and a transmission unit configured to transmit the uplink control information to a radio base station in the mobile communication system using the physical uplink shared channel determined by the control unit, wherein the control unit determines, when a physical uplink shared channel is set in a first cell in the plurality of cells, to transmit the uplink control information by using the physical uplink shared channel, and the control unit determines, when no physical uplink shared channel is set in the first cell, to transmit the uplink control information by using a physical uplink shared channel in a second cell.

For example, the first cell is a primary cell in the carrier aggregation, and the second cell is a secondary cell on which a physical uplink control channel is configured. In another example, the first cell is a secondary cell in the carrier aggregation on which a physical uplink control channel is configured, and the second cell is a secondary cell or a primary cell.

Effect of the Present Invention

According to an embodiment of the present invention, it becomes possible to provide a user apparatus that can determine a cell for uplink on which uplink control information should be transmitted by a PUSCH in a case where the uplink control information is transmitted via a PUSCH by performing piggyback in CA using a plurality of cells supporting PUCCH.

EMBODIMENTS FOR CARRYING OUT THE INVENTION

In the following, an embodiment of the present invention is described with reference to figures. The embodiment described below is merely an example, and the embodiment to which the present invention is applied is not limited to the embodiment below.

<System Configuration>

Figure 2:
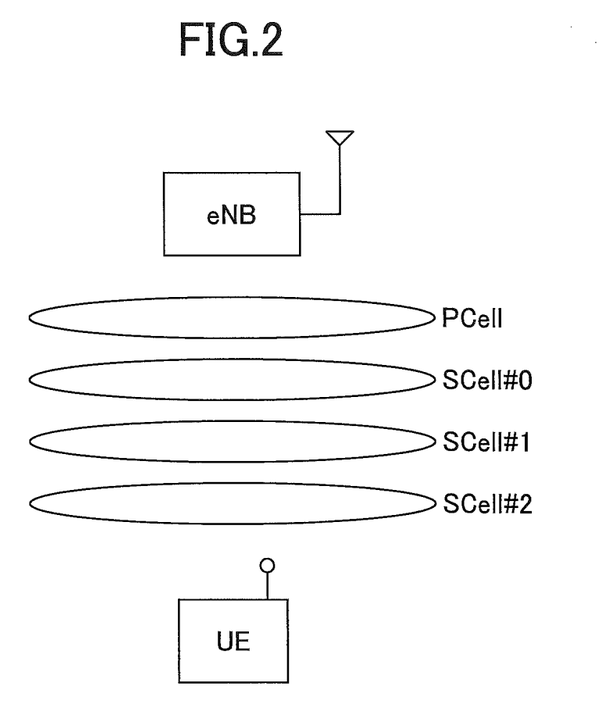
FIG. 2 is a diagram showing a configuration example of a mobile communication system according to an embodiment of the present invention.

FIG. 2 shows a configuration example of a mobile communication system according to an embodiment of the present invention. The mobile communication system of the present embodiment shown in FIG. 2 is a mobile communication system of the LTE-Advanced scheme, and is provided with a radio base station eNB that manages a PCell and SCells #0~#2, and a user apparatus UE. Although the example of FIG. 2 shows a case where three SCells are configured, this is merely an example. Each of the PCell and the SCells #0~#2 includes a cell for uplink and a cell for downlink.

Also, the PCell and the SCells #0~#2 may be managed by a plurality of radio base stations eNBs, or may be managed by a single radio base station eNB.

In the mobile communication system of the present embodiment, the user apparatus UE is configured to be able to perform CA using PCell/SCell supporting PUCCH. That is, in the mobile communication system of the present embodiment, PUCCH is supported in both of the PCell and the SCell. Also, PUSCH is supported in both of the PCell and the SCell. "PUCCH is supported in SCell" means that a user apparatus UE having an ability of transmitting a PUCCH on an SCell can transmit a PUCCH on an SCell if the PUCCH is configured on the SCell. Also, in the present embodiment, it is assumed that the method for configuring a PUCCH on an SCell in the user apparatus UE is basically the same as the method for configuring a PUCCH on a PCell in the LTE scheme. But, it is possible that the method for configuring a PUCCH differs between SCell and PCell.

<Apparatus Configuration>

Figure 3:
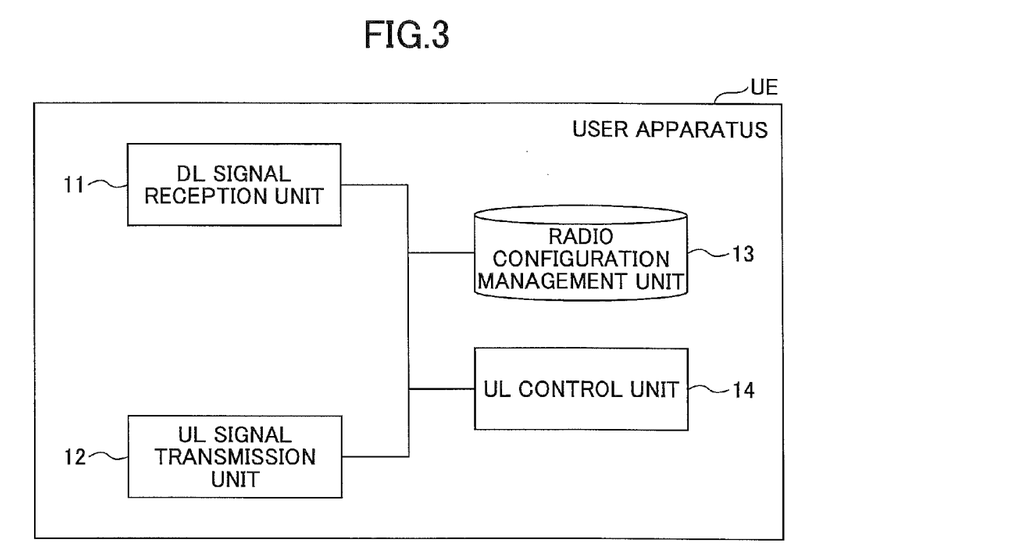
FIG. 3 is a functional block diagram of a user apparatus UE according to an embodiment of the present invention.

FIG. 3 shows a functional structure example of the user apparatus UE in the present embodiment. As shown in FIG. 3, the user apparatus UE includes a DL signal reception unit 11, an UL signal transmission unit 12, a radio configuration management unit 12 and an UL control unit 14. FIG. 3 only shows functional units particularly related to the present invention in the user apparatus UE, and the user apparatus US includes functions, not shown in the figure, at least for performing operation complying with the LTE-Advanced scheme.

The DL signal reception unit 11 has a function configured to receive various kinds of downlink signals from the radio base station eNB and to obtain upper layer information from the received physical layer signals. The UL signal transmission unit 22 is configured to generate various signals of the physical layer from upper layer information to be transmitted from the user apparatus UE and to transmit the signals to the radio base station eNB.

The radio configuration management unit 13 is a functional unit configured to execute and manage assignment of uplink/downlink radio resources and the like based on downlink control information received via a PDCCH (Physical Downlink Control Channel) from the radio base station eNB. Also, the radio configuration management unit 13 is a storage unit for storing various pieces of radio configuration information.

In the present embodiment, in each timing (in units of subframes, for example), for each cell for uplink in CA, the radio configuration management unit 13 holds information indicating whether a resource of a PUCCH is assigned (whether there is a PUCCH), information indicating whether a resource of a PUSCH is assigned (whether there is a PUSCH, in other words, whether a PUSCH is set), and information indicating whether PUSCH-PUCCH simultaneous transmission is available. By referring to the radio configuration management unit 13, the user apparatus UE can ascertain availability of use of a PUCCH, availability of use of a PUSCH, and availability of PUSCH-PUSCH simultaneous transmission for each cell and for each timing.

The UL control unit 14 is a functional unit configured to perform control of transmission of uplink control information, and to perform control of transmission of uplink control information via a PUSCH by piggyback in the present embodiment. That is, when transmitting uplink control information by a PUSCH, the UL control unit 14 determines via which cell's PUSCH the uplink control information is to be transmitted. The details of the control by the UL control unit 14 are described later.

Figure 4:
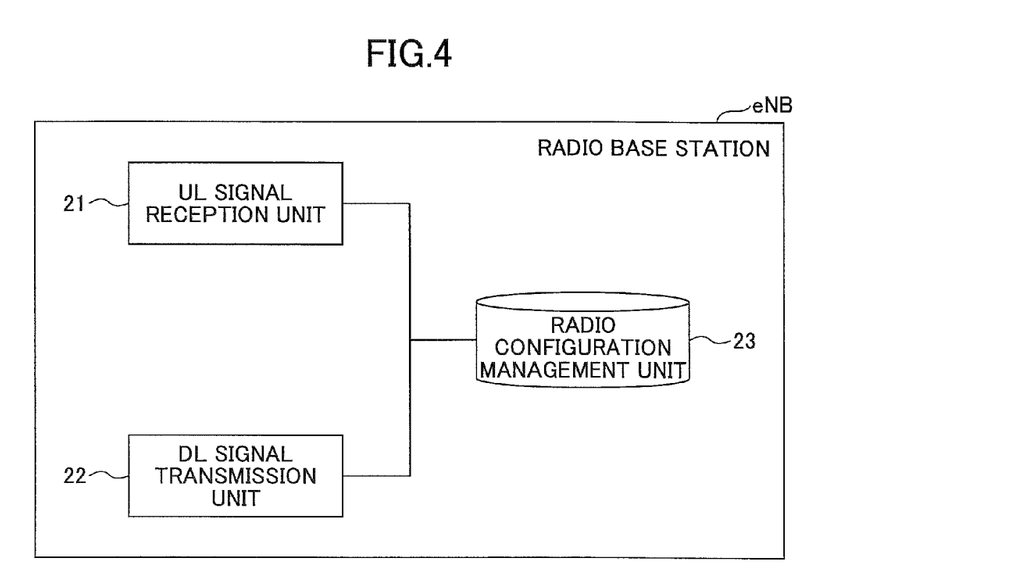
FIG. 4 is a functional block diagram of a radio base station eNB according to an embodiment of the present invention.

FIG. 4 shows a functional block diagram of the radio base station eNB of the present embodiment. As shown in FIG. 4, the radio base station eNB includes an UL signal reception unit 21, a DL signal transmission unit 22, and a radio configuration management unit 23. FIG. 4 only shows functional units particularly related to the present invention in the radio base station eNB, and the radio base station eNB includes functions, not shown in the figure, at least for performing operation complying with the LTE-Advanced scheme.

The UL signal reception unit 21 has a function configured to receive various kinds of uplink signals from the user apparatus UE and to obtain upper layer information from the received physical layer signals. The DL signal transmission unit 22 is configured to generate various signals of the physical layer from upper layer information to be transmitted from the radio base station eNB and to transmit the signals to the user apparatus UE.

The radio configuration management unit 23 is a functional unit configured to manage radio resources and the like assigned based on downlink control information via the PDCCH. Also, the radio configuration management unit 23 is a storage unit for storing various kinds of pieces of radio configuration information. In the present embodiment, in each timing (in units of subframes, for example), in each UE, for each cell for uplink forming CA, the radio configuration management unit 23 holds information indicating which resource is assigned for a PUCCH, information indicating which resource is assigned for a PUSCH, and information indicating whether PUSCH-PUCCH simultaneous transmission is available. By referring to the radio configuration management unit 23, the radio base station eNB can ascertain a resource of a PUCCH, a resource of a PUSCH, and availability of PUSCH-PUCCH simultaneous transmission for each cell of each UE In addition, the radio configuration management unit 23 stores information indicating control content (a method of determining a PUSCH) when performing piggyback in each UE. That is, the radio configuration management unit 23 holds information, for each UE, indicating which resource of which CC's PUSCH should be used for transmitting uplink control information in piggyback. When receiving piggybacked uplink control information from a UE, the radio base station eNB can assertion which CC of which UE the uplink control information is for, and can obtain the uplink control information. Also, when the uplink control information is feedback information of a downlink signal, the radio base station eNB can ascertain which downlink signal the feedback information is for based on a resource by which the uplink control information is received, for example.

<Operation Example>

Next, an operation example of the user apparatus UE is described with reference to the flowchart of FIG. 5. First, in step 1, the UL control unit 14 detects that transmission of uplink control information (UCI) is triggered. That is, the UL control unit 14 detects a transmission timing of the uplink control information. In this example, it does not matter which cell the uplink control information occurred on. That is, in this example, the same logic is used for control in any cell. An example is described later in which the control method is changed according to a cell on which the uplink control information occurs.

After step 1, the UL control unit 14 refers to the radio configuration management unit 13 so as to determine whether PUSCH transmission is triggered in a cell for uplink (step 2). That is, the UL control unit 14 determines whether a resource of a PUSCH is assigned in a cell so that data can be transmitted via the PUSCH by referring to the radio configuration management unit 13.

As a result of determination in step 2, when it is determined that PUSCH transmission is not triggered in any cell for uplink (No in step 2), the UL control unit 14 instructs the UL signal transmission unit 12 to transmit uplink control information by using a PUCCH, so that the UL signal transmission unit 12 transmits the uplink control information using the PUCCH (step 3). The PUCCH to be used here may be a PUCCH of a cell for uplink the same as a cell for downlink on which the downlink signal is received in a case where the uplink control information is feedback information (ACK/NACK, CQI and the like) for a downlink signal, for example. However, when the PUCCH is not configured on the cell, a PUCCH of a predetermined cell (example: PCell) is used, for example. Also, a cell for downlink for receiving a downlink signal may be associated with a cell for uplink for transmitting feedback information for the downlink signal so as to store the association information in the radio configuration management unit 13, so that the user apparatus UE may determine on which cell's PUCCH the uplink control information is transmitted according to the association information.

Also, in a case where the uplink control information is not the feedback information for the downlink signal (SR, for example), a PUCCH of a predetermined cell (PCell, for example) may be used.

Figure 5:
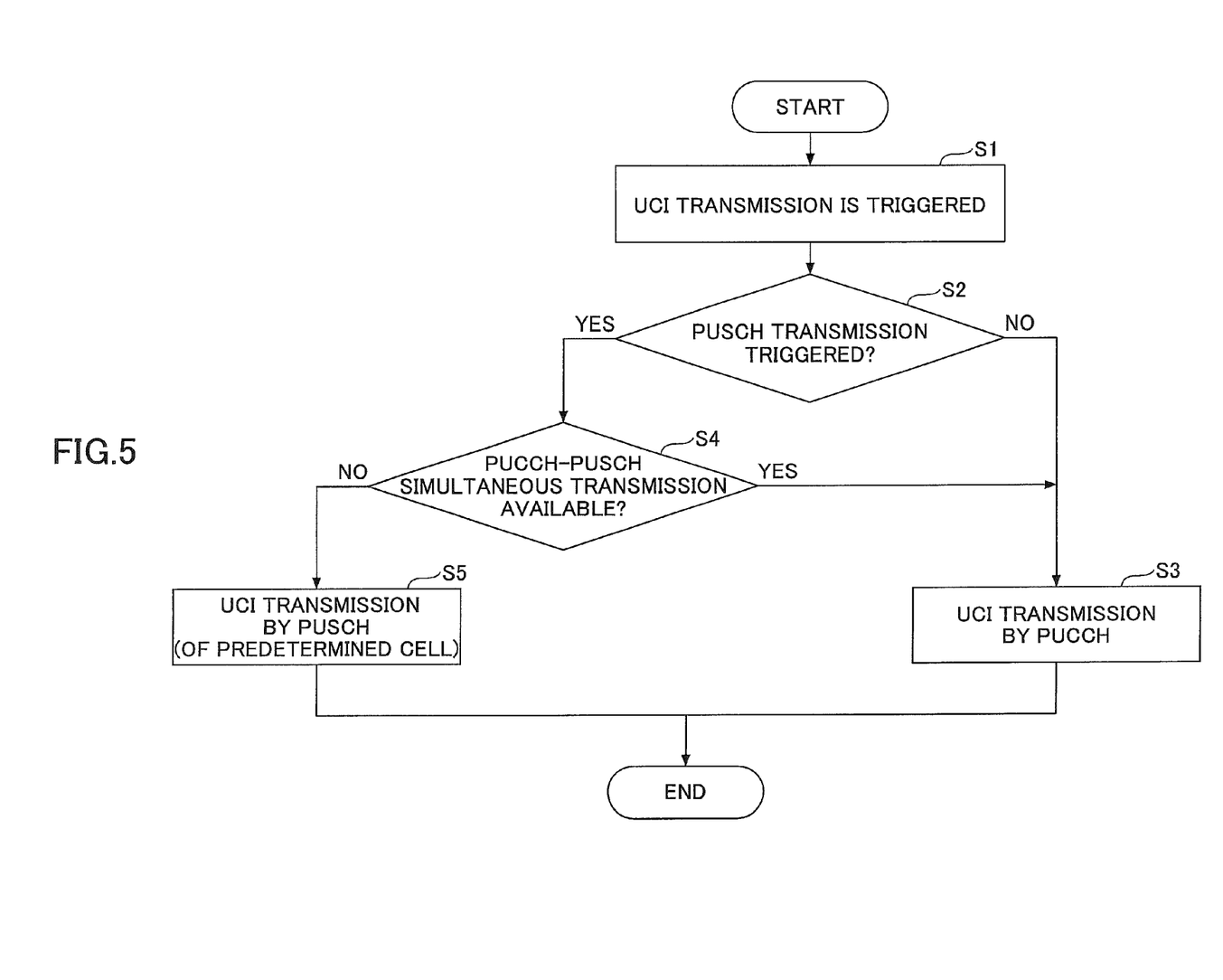
FIG. 5 is a flowchart for explaining an operation example of the user apparatus UE.

According to the determination in step 2 of FIG. 5, if the UL control unit 14 determines that PUSCH transmission is triggered in a cell, the UL control unit 14 refers to the radio configuration management unit 13 so as to determine whether PUCCH-PUSCH simultaneous transmission is available (step 4). When it is determined that PUCCH-PUSCH simultaneous transmission is available (Yes in step 4), the UL control unit 14 instructs the UL signal transmission unit 12 to transmit uplink control information by a PUCCH so that the UL signal transmission unit 12 transmits the uplink control information by the PUCCH in the same way as described before (step 3).

In a case where there are a plurality of PUCCHes that can be transmitted simultaneously with a PUSCH, a PUCCH of a cell (PCell, for example) that is predetermined for such a case is used. Also, a cell for downlink for receiving a downlink signal may be associated with a cell for uplink for transmitting feedback information for the downlink signal so as to store the association information, so that the user apparatus UE may determine on which cell's PUCCH the uplink control information is transmitted according to the association information.

In step 4, when it is determined by the UL control unit 14 that the simultaneous transmission of PUCCH and PUSCH is not available (No in step 4), the UL control unit 14 performs control such that the UL signal transmission unit 12 transmits uplink control information by a PUSCH in the following way (step 5).

(PUSCH Transmission Control Example 1 by UL Control Unit 14)

A PUSCH transmission control example 1 in step 5 is described with reference to a flowchart of FIG. 6.

The UL control unit 14 refers to the radio configuration management unit 13 to determine whether there is a PUSCH on a PCell (whether a resource of a PUSCH is assigned) (step 51). When the PUSCH is configured on the PCell (Yes in step 51), it is determined to transmit the uplink control information by the PUSCH (step 52). In other words, it is determined whether there is a PUSCH of a PCell in PUSCHes, determined in step 2 of FIG. 5, in which data transmission is triggered, and, if there is the PUSCH of the PCell, it is determined that the uplink control information is transmitted by the PUSCH on the PCell.

Figure 7:
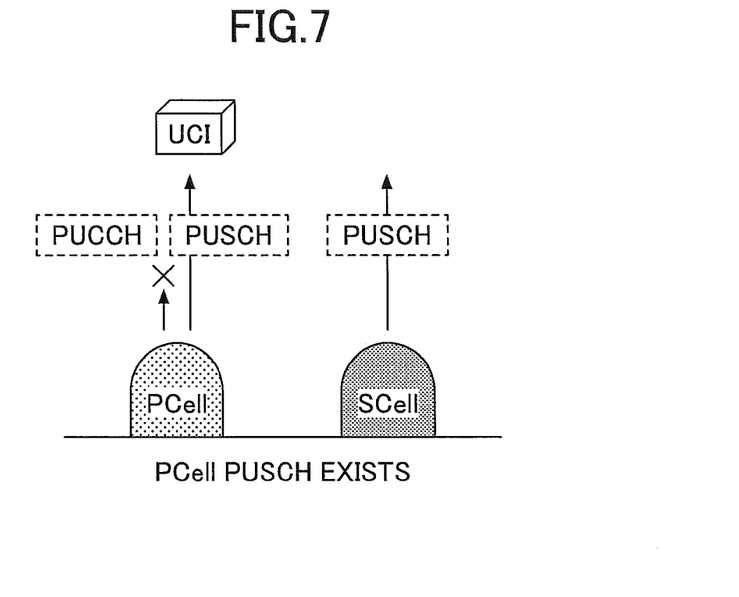
FIG. 7 is a diagram showing a transmission image (1) in a PUSCH transmission control example.

FIG. 7 shows a transmission image in this case. As shown in FIG. 7, a PUSCH is set on a plurality of cells. Since there is the PCell in the cells, the user apparatus UE transmits uplink control information (UCI) by the PUSCH of the PCell.

Figure 6:
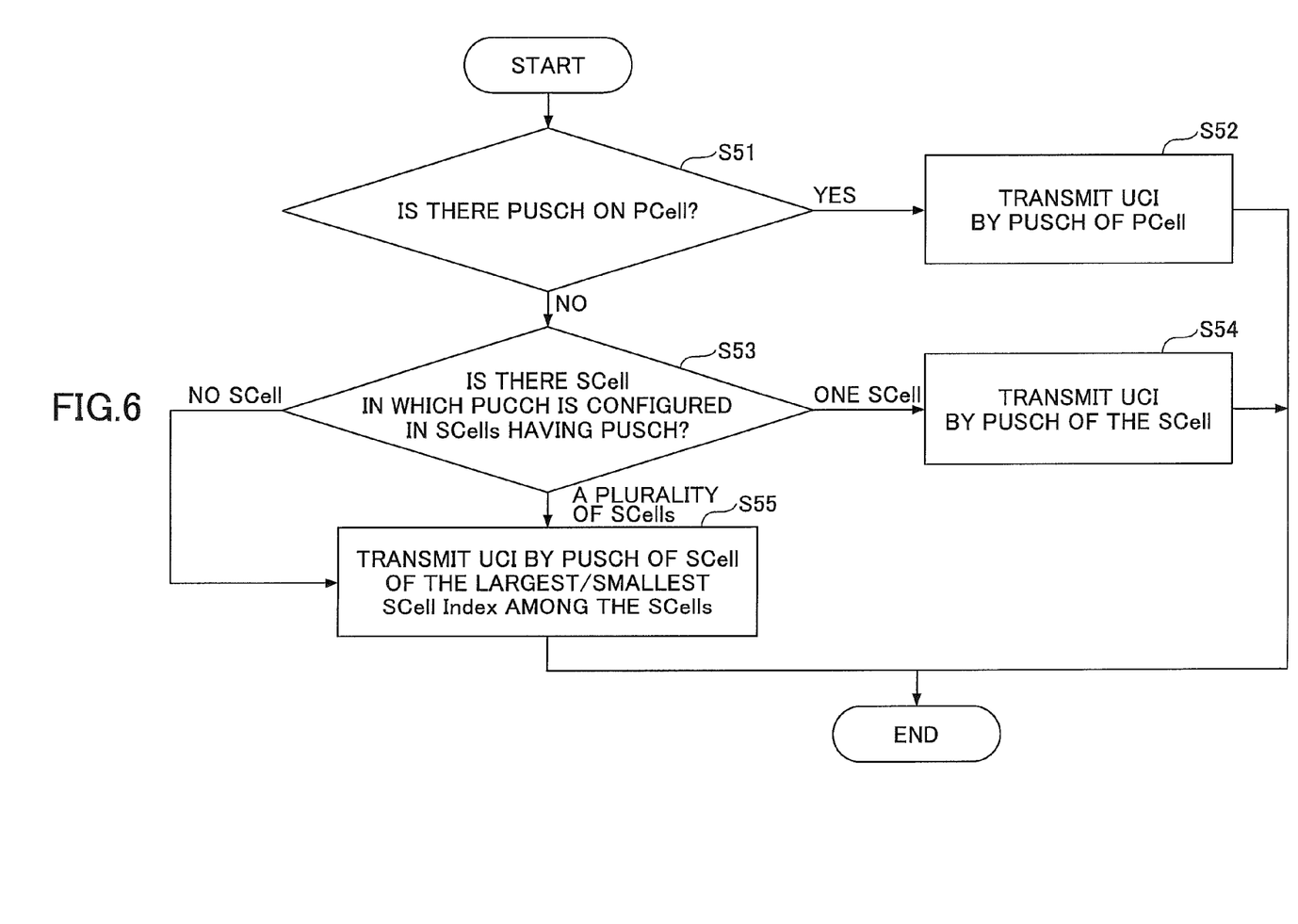
FIG. 6 is a flowchart for explaining a process in step 5 in FIG. 5.

When it is determined that there is no PUSCH in the PCell in the determination of step 51 (No in step 51) of FIG. 6, control is performed so as to transmit the uplink control information by a PUSCH of an SCell in which a PUCCH is configured. The meaning of "PUCCH is configured" is not that the simultaneous transmission with PUSCH is available, but, it means that a resource of a PUCCH is assigned so that the PUCCH can be transmitted at a timing different from the PUSCH.

More particularly, in step 53, the UL control unit 14 determines whether there is an SCell in which a PUCCH is configured among SCells in which there is a PUSCH by referring to the radio configuration management unit 13.

Figure 8:
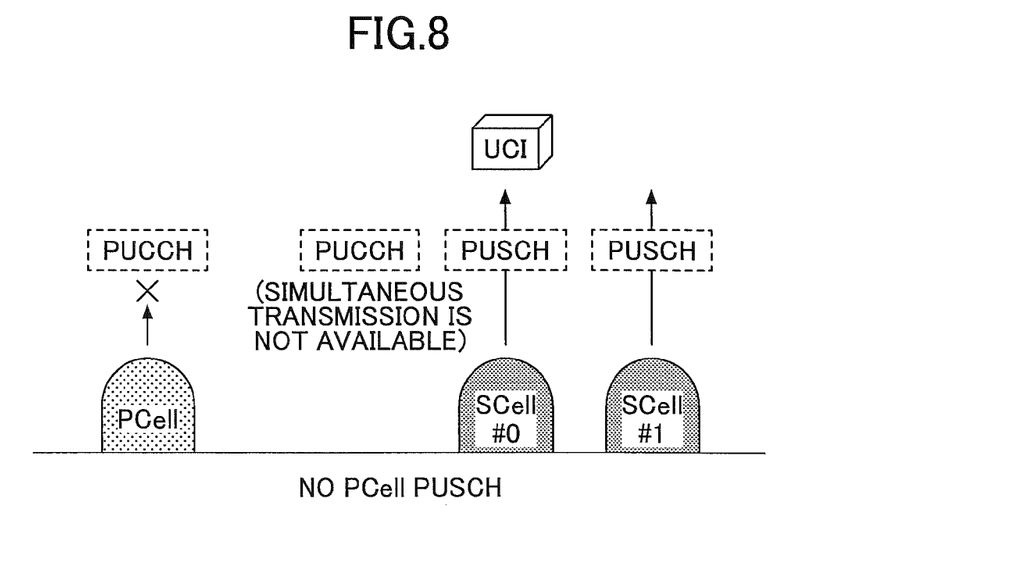
FIG. 8 is a diagram showing a transmission image (2) in a PUSCH transmission control example.

If there is only one SCell where the PUCCH is configured, it is determined to transmit the uplink control information by the PUSCH of the SCell (step 54). FIG. 8 shows a transmission image in this case. As shown in FIG. 8, PUSCH transmission is triggered in a plurality of SCells. In the plurality of SCells, the uplink control information is transmitted by using a PUSCH of the SCell#0 in which a PUCCH is configured.

In step 53, when it is determined that there are a plurality of SCells in which a PUCCH is configured, or when it is determined that there is not any SCell in which a PUCCH is configured, the process goes to step 55.

Figure 9:
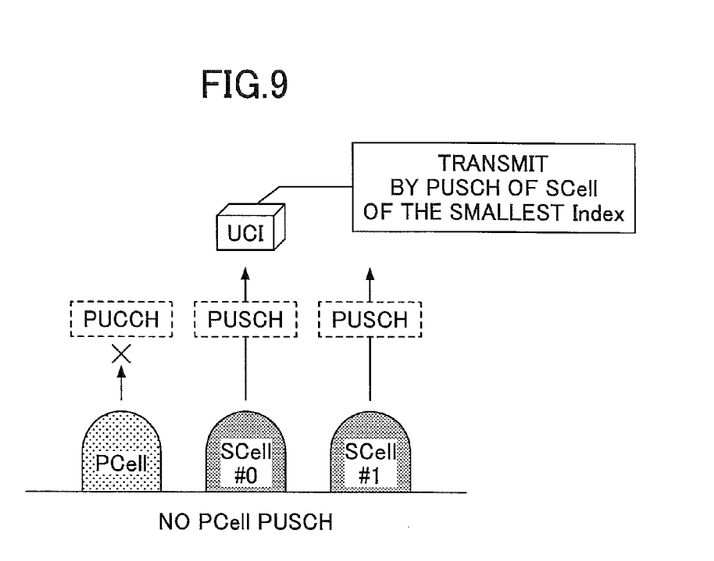
FIG. 9 is a diagram showing a transmission image (3) in a PUSCH transmission control example.

In step 55, it is determined to transmit uplink control information by using a PUSCH of an SCell of the smallest SCell Index or the largest SCell Index among a plurality of SCells in which a PUCCH is configured or among one or a plurality of SCells in which any PUCCH is not configured. A transmission image in this case is shown in FIG. 9. As shown in FIG. 9, a PUSCH is configured but a PUCCH is not configured in a plurality of SCells other than the PCell. In the SCells, in the example of FIG. 9, the uplink control information is transmitted by a PUSCH of the SCell#0 of the smallest Index.

The above-mentioned Index of SCell is reported by a signaling from the radio base station eNB when the Scell is configured, and is information stored in the radio configuration management unit 13. That is, the radio configuration management unit 13 stores information identifying component carriers and Indexes in which they are associated with each other.

In the above example, although control is performed by checking presence or absence of a PUCCH in step 53, an SCell for transmitting uplink control information by a PUSCH may be determined based on the size of the Index value (smallest, largest) of SCells irrespective of presence or absence of a PUCCH.

Also, in the above example, although transmission of uplink control information by a PUSCH on a PCell is given the highest priority, this is merely an example. It is possible to give the highest priority to transmission of uplink control information of a PUSCH on an SCell in which a PUCCH is configured, for example. In this case, when there is not any SCell that can transmit a PUSCH and has a PUCCH, a PUSCH to be used may be determined in an order of a PUSCH on a PCell, and a PUSCH of an SCell of the smallest/largest Index.

(PUSCH Transmission Control Example 2 by the UL Control Unit 14)

In the PUSCH transmission control example 1, it is assumed that a control logic (a logic for determining on which cell's PUSCH UCI should be transmitted) is set in the radio base station eNB and in the user apparatus UE beforehand in a fixed manner. However, the present invention is not limited to the case where the control logic is set beforehand in a fixed manner. The radio base station eNB may send information indicating control content to the user apparatus UE by a signaling, so that the user apparatus UE may perform PUSCH transmission control in the piggyback according to the information. The PUSCH transmission control example 2 is an example of such a case.

In this case, the information indicating the control content reported by the radio base station eNB to the user apparatus UE may differ from UE to UE. The radio base station eNB performs reception processing of the uplink control information from each user apparatus UE according to the reported control content.

The control content sent by the radio base station eNB to the user apparatus UE may be the same as each example described in the PUSCH transmission control example 1, or may be different from the control method of the PUSCH transmission control example 1.

As the different control, there is a method in which a PUSCH in a cell in which uplink control information occurs is used in the highest priority, and, control similar to that of the PUSCH transmission control example 1 is performed when there is not a PUSCH in the cell in which the uplink control information occurs. That is, for example, if there is a PUSCH in the SCell#0 at a timing when feedback information for a downlink signal of the SCell#0 should be transmitted, the feedback information is transmitted by the PUSCH, and if the PUSCH does not exist in the SCell#0, a PUSCH is determined according to the procedure of FIG. 6. In this example, when uplink control information occurs in the PCell, control is performed as shown in FIG. 6.

The above-mentioned different control content may be control content sent by a signaling, or may be control content set in a fixed manner in the PUSCH transmission control example 1 (another example of PUSCH transmission control example 1).

The notification sent from the radio base station eNB to the user apparatus UE may be sent using an RRC message that is transmitted from the radio base station eNB to the user apparatus UE when the user apparatus UE connects to the radio base station eNB. In this case, configuration by the notification is performed semi-statically connection by connection.

Other than the above-mentioned example, the control content may be included in a PDCCH that the radio base station eNB transmits to the user apparatus UE. For example, when the radio base station eNB transmits, to the user apparatus UE, downlink control information by using a PDCCH for assigning a resource of a physical downlink shared channel (PDSCH), the radio base station eNB may transmit information for specifying a cell for transmitting, by piggyback, feedback information of downlink data transmitted by the PDSCH assigned by the PDCCH by including the information in the downlink control information. As the information for specifying the cell used for transmission by piggyback, it is considered to transmit information listing pieces of cell information, such as a list of, in descending order of priority, a PCell, an SCell in which a PUCCH is configured, and an SCell of the largest/smallest Index. In this example of listing, in a case of transmitting feedback information of the downlink data by using piggyback, control similar to that of the above-mentioned PUSCH transmission control example 1 is performed. Also, as to uplink control information other than feedback information of downlink data, transmission control may be performed according to the specified information as mentioned above. Also, as to the uplink control information other than the feedback information of the downlink data, other downlink control information (system information, for example) may be sued for specifying control content.

Figure 10:
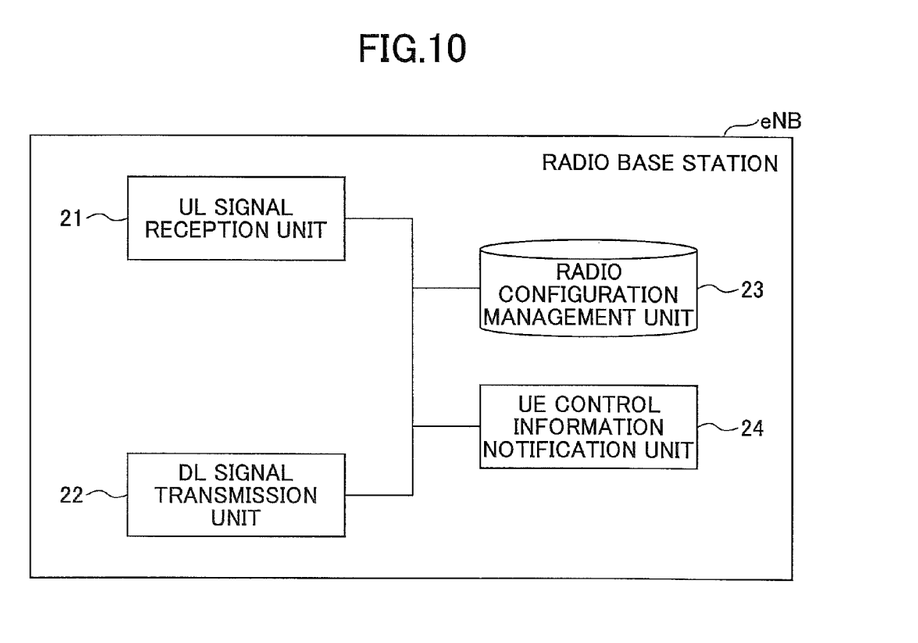
FIG. 10 is a functional block diagram of a radio base station eNB in a PUSCH transmission control example 2.

FIG. 10 shows a functional configuration example of the radio base station eNB in this example. The difference from the configuration shown in FIG. 4 is that a UE control information notification unit 24 is provided. The UE control information notification unit 24 passes information indicating the above-mentioned control content for the user apparatus UE to the DL signal transmission unit 22, and the DL signal transmission unit 22 transmits the information indicating the control content to the user apparatus UE. Information in the side of the radio configuration management unit 23 corresponding to the information indication the transmitted control content is stored in the radio configuration management unit 23 for each user apparatus UE. The radio base station eNB refers to this information so as to be able to obtain uplink control information transmitted from each user apparatus UE.

The user apparatus UE of this example is the same as the configuration shown in FIG. 3. In this example, information sent from the radio base station eNB is stored in the radio configuration management unit 13, so that the UL control unit 14 refers to the information to perform control according to the information.

(PUSCH Transmission Control Example 3 by the UL Control Unit 14)

In each of the PUSCH transmission control example 1 and the PUSCH transmission control example 2, similar control is performed irrespective of the type of the uplink control information at the transmission timing in step 1 of FIG. 5. However, the present invention is not limited to this example. In each of the PUSCH transmission control example 1 and the PUSCH transmission control example 2, control content may differ according to the type of uplink control information at the transmission timing.

For example, in a case where the uplink control information is feedback information for a downlink signal such as ACK/NACK and CQI, control similar to each example of the PUSCH transmission control example 1 is performed. When the uplink control information is information such as SR which is not the feedback information for the downlink signal, a PUSCH in the cell in which the uplink control information occurs is used in the highest priority, and if the PUSCH does not exist, control similar to the PUSCH transmission control example 1 is performed. Or, reversely, when the uplink control information is feedback information for a downlink signal such as ACK/NACK and CQI, a PUSCH in the cell in which the uplink control information occurs is used in the highest priority, and if the PUSCH does not exist, control similar to the PUSCH transmission control example 1 is performed, and if the uplink control information is not the feedback information for the downlink signal, control similar to the PUSCH transmission control example 1 may be performed.

The type of the uplink control information can be determined by the UL control unit 14. Also the above-mentioned control is merely an example. For example, each of ACK/NACK, CQI, and SR may have specific control content (control for determining on which cell's PUSCH transmission is performed).

What control should be performed for what type of uplink control information may be set in a fixed manner, for example, may be set to be the PUSCH transmission control type 1, or may be set by a signaling from the radio base station eNB like the PUSCH transmission control example 2. In either cases, the radio configuration management unit 13 stores type identification information of the uplink control information and information indicating control method corresponding to the type (for example, in a higher priority order, PCell, SCell on which PUCCH is configured, SCell of the largest/smallest Index), so that the UL control unit 14 refers to the information so as to be able to perform processes for determining a PUSCH by a control method suitable for each type.

(PUSCH Transmission Control Example 4 by UL Control Unit 14)

In each of the PUSCH transmission control example 1, the PUSCH transmission control example 2, and the PUSCH transmission control example 3, it is assumed that the same control is performed irrespective of which cell the uplink control information occurs on at the transmission timing in step 1 of FIG. 5. However, the present invention is not limited to this example, and the control content may differ according to the cell (CC) on which the uplink control information occurs at the transmission timing. That is, in each of the PUSCH transmission control example 1, the PUSCH transmission control example 2, and the PUSCH transmission control example 3, it is possible to determine on which cell's PUSCH the uplink control information is transmitted, for each cell, when performing piggyback in a case where the uplink control information occurs at the cell.

What control should be performed for which cell where uplink control information occurs may be set in a fixed manner, for example, may be set to be the PUSCH transmission control type 1, or may be set by a signaling from the radio base station eNB like the PUSCH transmission control example 2. In either cases, the radio configuration management unit 13 stores cell identification information and information indicating control method corresponding to the cell (for example, in a higher priority order, PCell, SCell on which PUCCH is configured, SCell of the largest/smallest Index), so that the UL control unit 14 refers to the information so as to be able to perform processes for determining a PUSCH by a control method suitable for each cell.

As an example of using different controls for each cell, there is a method, for example, of using a PUSCH of a cell on which uplink control information occurs with the highest priority, and performing control the same as one of the PUSCH control example 1 if there is no PUSCH on the cell on which the uplink control information occurs. Also, a cell on which uplink control information is to be transmitted by a PUSCH may be predetermined for each cell together with priority order, so that the determined information is stored as correspondence information in the radio configuration management unit 13 of the user apparatus UE and the radio configuration management unit 23 of the radio base station eNB so as to perform control based on the stored information. The method of storing may be set in a fixed manner or may be instructed by a signaling like the PUSCH transmission control example 2.

<Modified Example>

In the LTE-Advanced scheme, there is a case where a cell for uplink by which uplink control information is to be transmitted is preset for a cell for downlink (cells are grouped). For example, this case corresponds to a case where Inter-site CA is configured. That is, in the mobile communication system, there is a case where a plurality of cells which are aggregated by CA are grouped to a plurality of groups.

Figure 11:
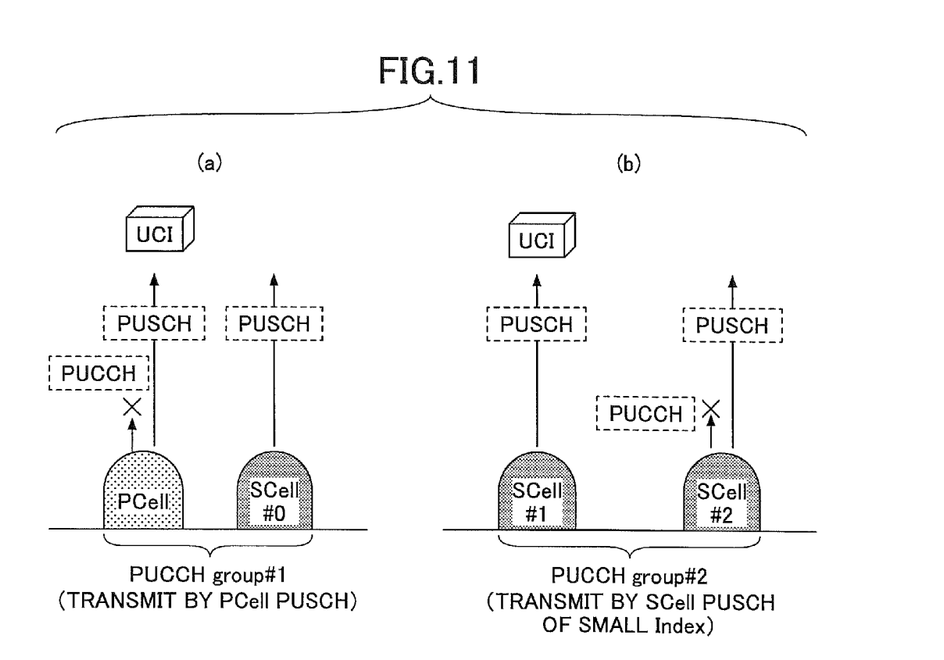
FIG. 11 is a diagram showing a transmission image of UCI in a modified example.

In a case where cells are grouped as mentioned above, control as described in the aforementioned embodiment is performed within each group. FIG. 11 shows a transmission image in this case. FIG. 11 shows a case in which a plurality of cells are grouped into a group #1 including a PCell and an SCell#0 and a group #2 including an SCell#1 and an SCell#2. In this case, uplink control information that occurs in the PCell or the SCell#0 is transmitted in a cell for uplink in the group #1, and uplink control information that occurs in the SCell#1 or the SCell#2 is transmitted in a cell for uplink in the group #2. Such information of grouping is stored in the radio configuration management unit 13 in the user apparatus UE, and is stored in the radio configuration management unit 23 in the radio base station eNB. Each of the user apparatus UE and the radio base station eNB can perform CA control according to the grouping.

In the example shown in FIG. 11, control the same as that of the before-mentioned PUSCH control example 1 is performed independently in each group. In the group#1 of FIG. 11 (*a*), uplink control information is transmitted by a PUSCH of the PCell which is given the highest priority. In the group#2 of FIG. 11 (*b*), uplink control information is transmitted by a PUSCH of SCell#1 that has the smallest Index. Of course, in each group, control may be performed using any of the PUSCH control example 2, the PUSCH control example 3, and the PUSCH control example 4, and the control method may differ from group to group.

The above-mentioned group may be associated with a timing advance group (TAG) in multiple timing advance (MTA), for example. In the following, outlines of MTA and TAG are described.

As to cells for uplink, if frequencies and/or coverages of a PCell and an SCell are different, the DL reception timing and the UL transmission timing are different for each cell. Thus, it is necessary to establish uplink synchronization (UL synchronization) for each cell. In the LTE-Advanced scheme, for the purpose of establishing uplink synchronization between the radio base station eNB and the user apparatus UE, it is defined that the radio base station eNB transmits, to the user apparatus UE, a timing advance (TA) value for adjusting transmission timing of the uplink signal of the user apparatus.

The radio base station eNB sends the TA value to respective user apparatuses UEs so as to be able to receive uplink signals from the respective user apparatuses UEs at the same time. In general, propagation delay characteristics and attenuation characteristics of radio waves differ from cell to cell. Thus, when UL CA for UL transmission is configured using a plurality of CCs, ideally, it is considered to measure the TA value for each cell, that is, for each component carrier (CC) so as to send the TA value to each user apparatus UE. However, such a process is not desirable from the viewpoint of decreasing signaling, and easing process load of the user apparatus UE and the radio base station eNB.

Therefore, it is being studied to define a group of component carriers (CCs) having similar radio characteristics to be a timing advance group (TAG) so as to perform control of transmission timing by a TA value for each TAG. This is referred to as MTA (Multiple Timing Advances). TAG includes one or more CCs. Not only TA but also a time alignment timer (synchronization timer, TA timer) and a downlink reference timing are used commonly in CCs within a TAG. As to TAT, when TAT expires, the user apparatus UE regards that the user apparatus UE is out of UL-synchronization, and releases resources. The resource in this case includes time and frequency for transmitting a PUSCH, and/or includes time and frequency for transmitting a sounding reference signal (SRS).

Figure 12:
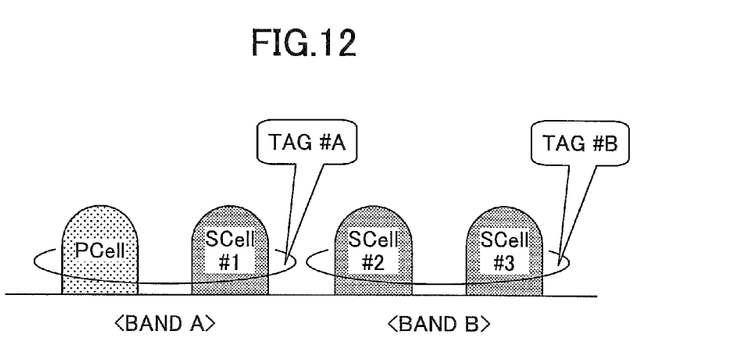
FIG. 12 is a diagram for explaining TAG in a modified example.

FIG. 12 is a diagram schematically showing an image in which two TAGs are formed. In the case of the example shown in the figure, a PCell and 3 SCells are configured. In addition, in this example, a TAG is formed for each band. In the case of the example shown in the figure, the PCell and the SCell#1 belonging to a band A is included in a TAG#A, and the SCell#2 and the SCell#3 belonging to a band B is included in a TAG#B.

In this modified example, a method of piggyback control for the uplink control information is determined for each group of TAG that is grouped in the above-mentioned way, so that piggyback control is performed by a respective method in each group.

Figure 13:
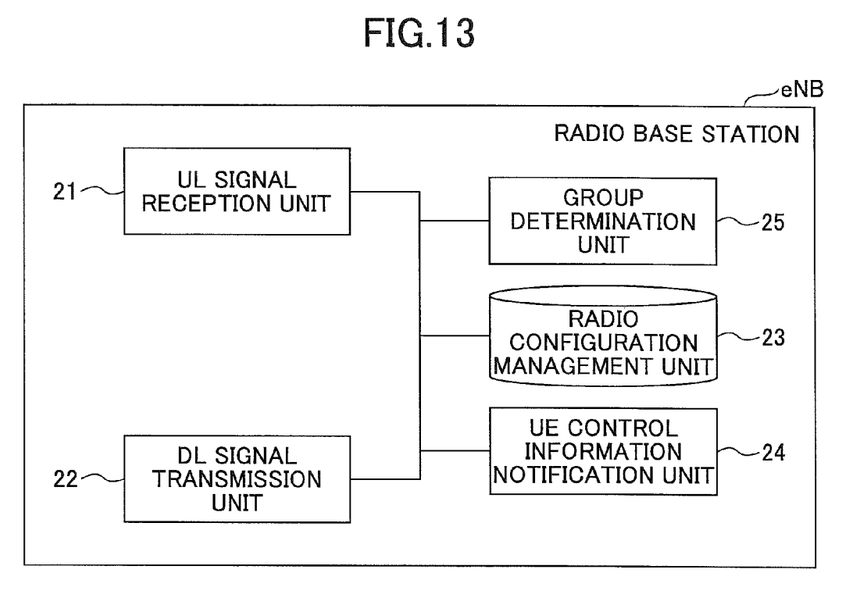
FIG. 13 is a functional block diagram of a radio base station eNB in a modified example.

The configuration example of the radio base station eNB is shown in FIG. 13. As shown in FIG. 13, it is different from the configuration of FIG. 10 in that a group determination unit 25 is provided. In this example, the group determination unit 25 performs cell measurement and the like to determine a TAG that is a group. In the radio base station eNB, information of groups (information indicating which cell belongs to which group) determined by the group determination unit 25 is stored in the radio configuration management unit 23 for each user apparatus UE. And, corresponding group information is sent to each user apparatus UE, and the user apparatus UE stores information of groups in the radio configuration management unit 13. Also, for example, in a case where control content is configured by a signaling according to the PUSCH control example 2, the radio base station eNB sends a signaling according to the PUSCH control example 2 to the user apparatus UE for each group, so that the radio base station eNB and the user apparatus UE perform control according to the information sent by the signaling for each group.

In a case where groups are predetermined regardless of whether the groups are TAG or other groups, the control content may be configured by a signaling by the PUSCH control example 2, or may be configured in a fixed manner like the PUSCH control example 1. In either case, identification information of groups and information indicating control methods corresponding to each group (in descending order of priority, PCell, SCell in which PUCCH is configured, SCell of the largest/smallest Index, in a higher priority order, for example) are stored in the radio configuration management unit 13 for each group so that the UL control unit 14 can perform control for each group by referring to the information.

<Condition on the State of SCell>

In the embodiment of the present invention including the above-mentioned examples and the modified example, when performing piggyback of the uplink control information to a PUSCH of an SCell, it is necessary that the SCell meets the following conditions.

A first condition is that the SCell is in an active state. The radio configuration management unit 13 stores information indicating whether the SCell is activated, so that the UL control unit 14 can ascertain whether the SCell is activated by referring to the radio configuration management unit 13.

A second condition is that UL synchronization is established for the SCell (or a group to which the SCell belongs). The user apparatus UE determines whether UL synchronization is established for the SCell by determining whether the synchronization timer (TA timer) for the SCell is running. That is, if the TA timer has not been expired and is running, it is determined that the UL synchronization is established. For example, the radio configuration management unit 13 has the synchronization timer (TA timer), so that the UL control unit 14 refers to the radio configuration management unit 13 to determine whether synchronization is established.

In the present embodiment, the UL control unit 14 determines a cell among SCells satisfying the above-mentioned conditions and the PCell for transmitting uplink control information by using a PUSCH based on methods described so far.

<Summary of the Embodiment>

According to the present embodiment, there is provided a user apparatus UE in a mobile communication system in which carrier aggregation is performed using a plurality of cells, including: an UL control unit 14 configured to determine whether a physical uplink shared channel is set in the user apparatus UE at a transmission timing of uplink control information in the user apparatus UE, and to determine to transmit the uplink control information by using the physical uplink shared channel when the physical uplink shared channel is set; and an UL signal transmission unit 12 configured to transmit the uplink control information to a radio base station in the mobile communication system using the physical uplink shared channel determined by the control unit.

The UL signal transmission unit 12 determines, when a physical uplink shared channel is set in a first cell in the plurality of cells, to transmit the uplink control information by using the physical uplink shared channel, and determines, when no physical uplink shared channel is set in the first cell, to transmit the uplink control information by using a physical uplink shared channel in a second cell.

For example, the first cell is a primary cell in the carrier aggregation, and the second cell is a secondary cell on which a physical uplink control channel is configured. In another example, the first cell is a secondary cell in the carrier aggregation on which a physical uplink control channel is configured, and the second cell is a secondary cell or a primary cell.

When a physical uplink shared channel is set on a plurality of secondary cells, the UL control unit 14 is configured to determine to transmit the uplink control information by using a physical uplink shared channel of a secondary cell having a largest or a smallest index among the plurality of secondary cells. When a cell for transmitting the uplink control information using a physical uplink shared channel is a secondary cell of the carrier aggregation, conditions are that the secondary cell is activated and that uplink synchronization is established for the secondary cell.

Also, in an embodiment, the user apparatus UE receives information indicating control content, from the radio base station, for determining a physical uplink shared channel to be used for transmitting the uplink control information, stores the information in a radio configuration management unit 13, and the UL control unit 14 determines a physical uplink shared channel to be used for transmitting the uplink control information according to the information received from the radio base station eNB.

In an embodiment, the UL control unit 14 determines a type of the uplink control information so as to determine a physical uplink shared channel to be used for transmitting the uplink control information by a method corresponding to the type that is determined. Also, in an embodiment, the UL control unit 14 determines a cell on which the uplink control information occurs so as to determine a physical uplink shared channel to be used for transmitting the uplink control information by a method corresponding to the cell that is determined.

Further, in an embodiment, when the plurality of cells which are aggregated in the mobile communication system are grouped into a plurality of groups, the UL control unit 14 determines a physical uplink shared channel to be used for transmitting the uplink control information that occurs in each group by a method determined for the respective group.

According to an embodiment of the present invention, there is provided an uplink control information transmission method performed by a user apparatus UE in a mobile communication system in which carrier aggregation is performed using a plurality of cells, including: a control step of determining whether a physical uplink shared channel is set in the user apparatus UE at a transmission timing of uplink control information in the user apparatus UE, and determining to transmit the uplink control information by using the physical uplink shared channel when the physical uplink shared channel is set; and a transmission step of transmitting the uplink control information to a radio base station in the mobile communication system using the physical uplink shared channel determined by the control step.

In the uplink control information transmission method, the control step includes determining, when a physical uplink shared channel is set in a first cell in the plurality of cells, to transmit the uplink control information by using the physical uplink shared channel, and determining, when no physical uplink shared channel is set in the first cell, to transmit the uplink control information by using a physical uplink shared channel in a second cell.

In the above, an embodiment on control for determining a PUSCH for piggyback has been explained. However, the disclosed invention is not limited to such an embodiment, and, those skilled in the art will conceive of various modified examples, corrected examples, alternative examples, substituted examples, and the like.

While specific numerical value examples are used to facilitate understanding of the present invention, such numerical values are merely examples, and any appropriate value may be used unless specified otherwise. Classification into each embodiment or item in the description is not essential in the present invention, and features described in two or more embodiments or items may be combined and used as necessary. Subject matter described in an item may be applied to subject matter described in another item (provided that they do not contradict).

It is not always true that the boundaries of the functional units or the processing units in the functional block diagram correspond to boundaries of physical components. The operations by the plural functional units may be physically performed by a single component. Alternatively, the operations by the single functional unit may be physically performed by plural components.

For convenience of explanation, the user apparatus UE and the radio base station eNB have been explained by using functional block diagrams. However, the apparatuses may be implemented in hardware, software, or a combination thereof. The software that operates by a processor included in the apparatus (the user apparatus UE, the radio base station eNB) may be stored in any proper storage medium such as a RAM (Random Access Memory), a flash memory, a ROM (Read Only Memory), an EPROM, an EEPROM, a register, a hard disk (HDD), a removable disk, a CD-ROM, a database, a server and the like.

The present invention is not limited to the above-mentioned embodiment and is intended to include various variations, modifications, alterations, substitutions and so on without departing from the spirit of the present invention.

The present application claims priority based on Japanese patent application No. 2012-262951, filed in the JPO on Nov. 30, 2012, and the entire contents of the Japanese patent application No. 2012-262951 are incorporated herein by reference.

DESCRIPTION OF REFERENCE SIGNS

UE user apparatus
eNB radio base station
11 DL signal reception unit
12 UL signal transmission unit
13 radio configuration management unit
14 UL control unit
21 UL signal reception unit
22 DL signal transmission unit
23 radio configuration management unit
24 UE control information notification unit
25 group determination unit

The invention claimed is:

1. A user apparatus in a mobile communication system in which carrier aggregation is performed using a plurality of cells, comprising:
a processor that determines whether a physical uplink shared channel is set in the user apparatus at a transmission timing of uplink control information in the user apparatus, and to determine to transmit the uplink control information by using the physical uplink shared channel when the physical uplink shared channel is set; and
a transmitter that transmits the uplink control information to a radio base station in the mobile communication system using the physical uplink shared channel determined by the processor,
wherein the processor determines, when a physical uplink shared channel is set in a first cell in the plurality of cells, to transmit the uplink control information by using the physical uplink shared channel, and the processor determines, when no physical uplink shared channel is set in the first cell, to transmit the uplink control information by using a physical uplink shared channel in a second cell, and
wherein the user apparatus receives information indicating control content, from the radio base station, for determining a physical uplink shared channel to be used for transmitting the uplink control information, stores the information in a storage unit, and the processor determines a physical uplink shared channel to be used for transmitting the uplink control information according to the information received from the radio base station.

2. The user apparatus as claimed in claim 1, wherein the first cell is a primary cell in the carrier aggregation, and the second cell is a secondary cell on which a physical uplink control channel is configured.

3. The user apparatus as claimed in claim 2, wherein, when a physical uplink shared channel is set on a plurality of secondary cells, the processor determines to transmit the uplink control information by using a physical uplink shared channel of a secondary cell having a largest or a smallest index among the plurality of secondary cells.

4. The user apparatus as claimed in claim 2, wherein, when a cell for transmitting the uplink control information using a physical uplink shared channel is a secondary cell of the carrier aggregation, the secondary cell is activated and uplink synchronization is established for the secondary cell.

5. The user apparatus as claimed in claim 2, wherein the processor determines a type of the uplink control information so as to determine a physical uplink shared channel to be used for transmitting the uplink control information by a method corresponding to the type that is determined.

6. The user apparatus as claimed in claim 2, wherein the processor determines a cell on which the uplink control information occurs so as to determine a physical uplink shared channel to be used for transmitting the uplink control information by a method corresponding to the cell that is determined.

7. The user apparatus as claimed in claim 2, wherein, when the plurality of cells which are aggregated in the mobile communication system are grouped into a plurality of groups, the processor determines a physical uplink shared channel to be used for transmitting the uplink control information that occurs in each group by a method determined for the respective group.

8. The user apparatus as claimed in claim 1, wherein the first cell is a secondary cell in the carrier aggregation on which a physical uplink control channel is configured, and the second cell is a secondary cell or a primary cell.

9. The user apparatus as claimed in claim 8, wherein, when a physical uplink shared channel is set on a plurality of secondary cells, the processor determines to transmit the uplink control information by using a physical uplink shared channel of a secondary cell having a largest or a smallest index among the plurality of secondary cells.

10. The user apparatus as claimed in claim 8, wherein, when a cell for transmitting the uplink control information using a physical uplink shared channel is a secondary cell of the carrier aggregation, the secondary cell is activated and uplink synchronization is established for the secondary cell.

11. The user apparatus as claimed in claim 8, wherein the processor determines a type of the uplink control information so as to determine a physical uplink shared channel to be used for transmitting the uplink control information by a method corresponding to the type that is determined.

12. The user apparatus as claimed in claim 8, wherein the processor determines a cell on which the uplink control information occurs so as to determine a physical uplink shared channel to be used for transmitting the uplink control information by a method corresponding to the cell that is determined.

13. The user apparatus as claimed in claim 1, wherein, when a cell for transmitting the uplink control information using a physical uplink shared channel is a secondary cell of the carrier aggregation, the secondary cell is activated and uplink synchronization is established for the secondary cell.

14. The user apparatus as claimed in claim 1, wherein the processor determines a type of the uplink control information so as to determine a physical uplink shared channel to be used for transmitting the uplink control information by a method corresponding to the type that is determined.

15. The user apparatus as claimed in claim 1, wherein the processor determines a cell on which the uplink control information occurs so as to determine a physical uplink shared channel to be used for transmitting the uplink control information by a method corresponding to the cell that is determined.

16. The user apparatus as claimed in claim 1, wherein, when the plurality of cells which are aggregated in the mobile communication system are grouped into a plurality of groups, the processor determines a physical uplink shared channel to be used for transmitting the uplink control information that occurs in each group by a method determined for the respective group.

17. An uplink control information transmission method performed by a user apparatus in a mobile communication system in which carrier aggregation is performed using a plurality of cells, comprising:
 a control step of determining whether a physical uplink shared channel is set in the user apparatus at a transmission timing of uplink control information in the user apparatus, and determining to transmit the uplink control information by using the physical uplink shared channel when the physical uplink shared channel is set;
 a transmission step of transmitting the uplink control information to a radio base station in the mobile communication system using the physical uplink shared channel determined by the control step;
 a reception step of receiving information indicating control content, from the radio base station, for determining a physical uplink shared channel to be used for transmitting the uplink control information; and
 a storing step of storing the information in a storage,
 wherein the control step includes determining, when a physical uplink shared channel is set in a first cell in the plurality of cells, to transmit the uplink control information by using the physical uplink shared channel, and determining, when no physical uplink shared channel is set in the first cell, to transmit the uplink control information by using a physical uplink shared channel in a second cell, and
 wherein the control step determines a physical uplink shared channel to be used for transmitting the uplink control information according to the information received from the radio base station.

* * * * *